Figures 1, 2:
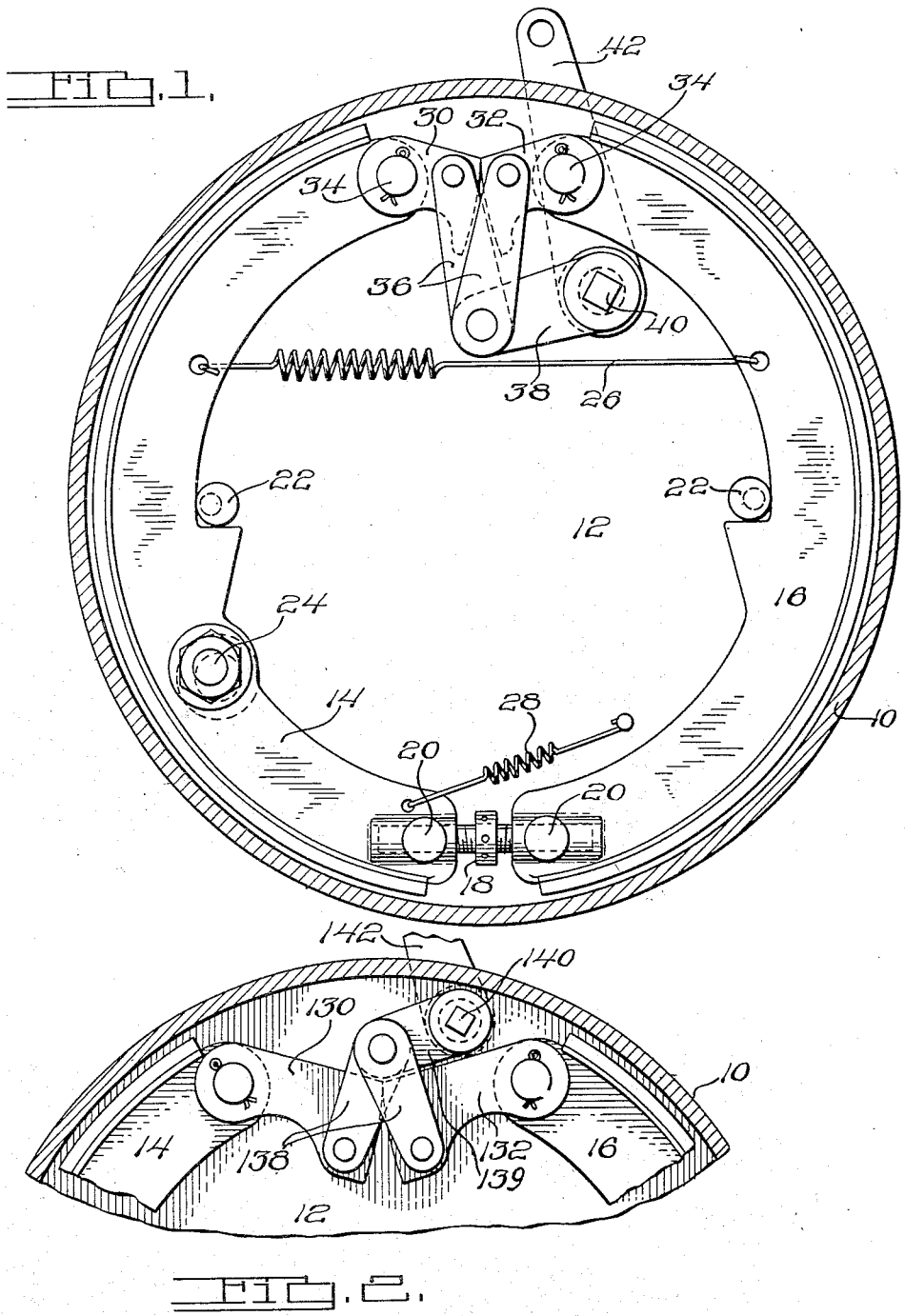

July 10, 1934.  C. H. TAYLOR  1,966,151

BRAKE

Original Filed March 12, 1928

INVENTOR
Cecil H. Taylor
BY
Jn. W. McConkey
ATTORNEY

Patented July 10, 1934

1,966,151

UNITED STATES PATENT OFFICE 1,966,151

BRAKE

Cecil H. Taylor, South Bend, Ind., assignor to Bendix Brake Company, South Bend, Ind., a corporation of Illinois Application March 12, 1928, Serial No. 260,877
Renewed June 22, 1932

12 Claims. (Cl. 188—78)

This invention relates to brakes, and is illustrated as embodied in an internal expanding automobile brake. An object of the invention is to provide simple operating means for the brake. Preferably this means includes members having cam surfaces in edge-to-edge engagement with each other, and which are linked to an operating lever or otherwise arranged to be operated simultaneously to apply the brake.

The above and other objects and features of the invention, including various novel and desirable details of construction, will be apparent from the following description of two illustrative embodiments shown in the accompanying drawing, in which:

Figure 1 is a vertical section through the brake, just inside the head of the brake drum and showing the brake shoes in side elevation; and Figure 2 is a partial section corresponding to the upper part of Figure 1, but showing a different modification.

The illustrated brake includes a rotatable drum 10, at the open side of which is a suitable support such as a backing plate 12, and within which is arranged the friction means of the brake. The brake friction means illustrated includes two floating shoes 14 and 16. These shoes may be adjustably connected by a right-and-left threaded member 18 extending into sockets in the shoe ends and threaded through cylindrical connectors 20 extending transversely through the shoes.

In this particular brake there are two fixed anchors 22, shown as adjustable eccentrics, carried by the backing plate 12. When the drum is turning clockwise, shoe 14 transmits the torque of the brake to its anchor 22; when the drum is turning counterclockwise it is the shoe 16 which transmits the torque of the brake to its anchor 22.

The idle positions of the shoes are determined by anchors 22, and by one or more steady rests 24 of any desired construction, together with a main return spring 26 tensioned between the shoes and an auxiliary return spring 28 tensioned between one of the shoes and the backing plate 12.

The novel operating means of the brake includes members 30 and 32 connected by pivots 34 to the ends of shoes 14 and 16 respectively, and which members have cam surfaces in edge-to-edge engagement with each other so that when the two members are lifted upwardly the shoes are spread apart to apply the brake This may be done by connecting members 30 and 32 by means of pivoted links 36 to an arm 38 fixed on an operating shaft 40 rocked by a lever 42 outside the backing plate.

In the embodiment of Figure 2, links 138 for the members 130 and 132, which correspond to members 30 and 32, extend upwardly instead of downwardly, and are operated as before by an arm 139 on a shaft 140 having an operating lever 142.

While two illustrative embodiments have been described in detail, it is not my intention to limit the scope of the invention to that particular embodiment, or otherwise than by the terms of the appended claims.

I claim:

1. A brake comprising, in combination, a drum friction means including parts which are separable to apply the brake, members connected respectively to said parts and which have cam surfaces in edge-to-edge rolling engagement with each other, a toggle connecting the members, and means for spreading the toggle to apply the brake.

2. A brake comprising, in combination, a support shoes having adjacent ends which are separable to apply the brake, members connected respectively to said ends and which have cam surfaces in edge-to-edge rolling engagement with each other, a toggle connecting the members, and means mounted on the support adjacent the members for spreading said toggle to apply the brake.

3. A brake comprising, in combination, a support friction means including parts which are separable to apply the brake, members connected respectively to said parts and which have cam surfaces in edge-to-edge rolling engagement with each other, an operating lever pivotally mounted on the support adjacent the members, and links connecting the lever to both of said members.

4. A brake comprising, in combination, shoes having adjacent ends which are separable to apply the brake, members connected respectively to said ends and which have cam surfaces in edge-to-edge rolling engagement with each other, an operating lever and links each having one end pivoted on the lever and their other ends pivoted to said members.

5. A brake comprising, friction means having separable ends, members pivotally connected respectively to said ends having rolling surfaces in edge to edge engagement, and operating means connected to the members including a toggle and means to straighten the toggle and apply the brake.

6. A brake comprising, a support, friction means having separable ends, members pivotally connected respectively to said ends having rolling surfaces in edge to edge engagement, a lever on the support and a toggle having its knee pinned to the lever and its legs pivoted respectively to the members.

7. A brake comprising friction means having separable ends, members pivotally connected respectively to said ends forming a toggle with rolling cam surfaces, a lever adjacent the members, and links connecting the lever to the members for straightening the toggle and applying the brakes.

8. A brake comprising a drum, a pair of floating shoes linked together at one end, an anchor for each shoe located generally midway between the ends of each shoe, applying means acting with substantially equal force on the unconnected ends of the shoes, and resilient tension means maintaining each of said shoes in contact with its anchor until after friction contact of the drum with the shoes.

9. A brake comprising a drum, a pair of floating articulated shoes, an anchor for each shoe centrally located with respect thereto, one anchor adapted to take the torque of both shoes for one direction of rotation and the other anchor adapted to take the torque of both shoes in reverse rotation direction, and means retaining said shoes in contact with both anchors, until frictional contact between said shoes and said drum takes place.

10. A brake comprising a drum, a pair of floating shoes linked together at one end and actuated at the other, a pair of anchors associated with said shoes, each anchor effective at a point intermediate the ends of its shoe and preventing rotation of its shoe toward its actuated end, and means maintaining each of said shoes in engagement with its anchor until counteracted by frictional contact of a shoe with the drum.

11. A brake comprising a drum, a pair of articulated shoes, an anchor for each shoe centrally located with respect thereto, means for actuating said shoes adapted to retain both shoes in anchor engagement until initial frictional drum contact.

12. A brake comprising a drum, a pair of shoes connected at one end, an anchor for each shoe effective at a point located in a central portion of its shoes, means for actuating said brake and adapted to retain both shoes in anchor engagement until initial frictional contact is effected.

CECIL H. TAYLOR.